United States Patent Office 3,509,079
Patented Apr. 28, 1970

3,509,079
POLYETHER POLYOL COMPOSITIONS CONTAINING EXPANDABLE STYRENE POLYMER BEADS
Michael A. Hyde and Jerry D. Ilavsky, Sarnia, Ontario, Canada, assignors to The Dow Chemical Company, Midland, Mich., a corporation of Delaware
No Drawing. Filed Mar. 6, 1969, Ser. No. 805,036
Int. Cl. C08j 1/26; C08g 53/08; C08f 47/10
U.S. Cl. 260—2.5
4 Claims

ABSTRACT OF THE DISCLOSURE

The disclosure concern dispersions of thermally expandable organic polymers in liquid polyether polyols.

This invention concerns compositions of liquid polyether polyols and thermally expandable organic polymer, e.g., styrene polymer, particles.

---

It is known to make a composite cellular material by forming a dispersion of thermally expandable solid styrene polymer particles or granules in a liquid precursor of a cellular polyurethane foam and allowing the ingredients in the polyurethane recipe to react, whereby the exothermic heat of reaction of the ingredients in forming the urethane foam simultaneously expands the particles of styrene polymer to cellular bodies dispersed throughout the polyurethane foam.

In preparing the composite cellular material it is known to disperse the thermally-expandable styrene polymer particles in a polyurethane foam-forming mixture of ingredients, except for the polyisocyanate, then immediately to add and mix the polyisocyanate intimately throughout the materials after which the resulting mixture is poured into a mold, such as a paperboard box, or onto a moving belt trough mold, and allowing the heat evolved in the course of the exothermic polyurethane foam-forming reaction to expand the styrene polymer to a cellular condition.

The thermally expandable styrene polymer particles containing volatile fluid organic blowing agents such as saturated aliphatic and cycloaliphatic hydrocarbons and perchlorofluoroaliphatic and cycloaliphatic hydrocarbons having a molecular weight of at least 58 and a boiling point below 95° C. at 760 mm. of Hg absolute pressure, often upon storage at ordinary temperatures and atmospheric pressure, and especially upon storing for prolonged periods of time, lose an appreciable proportion of the volatile blowing agent contained therein, which seriously impairs their ability to foam to a cellular product of a desired low density, e.g., a density of from 0.5 to 2.5 pounds per cubic foot.

It has now been discovered that dispersions of granules or beads of thermally expandable styrene polymers in liquid polyether polyols are not only stable to storing for prolonged periods of time without softening or agglomerating of the beads and without appreciable loss of the volatile organic fluid foaming agent contained therein, but also that such liquid dispersions of polyols and expandable styrene polymer particles, are surprisingly suited for use as the polyol ingredient in polyurethane formulations or recipes for making composite cellular materials comprising bodies of a cellular styrene polymer dispersed throughout a polyurethane foam matrix.

The thermally expandable styrene polymer can be a homopolymer or a copolymer of two or more monovinyl aromatic compounds such as styrene, vinyltoluene, vinylxylene, ethylvinylbenzene, isopropylstyrene, chlorostyrene, dichlorostyrene, or chlorovinyltoluene, or copolymers of at least one such monovinyl aromatic compound and a minor proportion of another ethylenically unsaturated vinyl or vinylidene compound such as acrylonitrile, methacrylonitrile, methyl acrylate, methyl methacrylate, butyl acrylate, or butyl methacrylate. Copolymers of one or more of such monovinyl aromatic compounds cross-linked with from 0.01 to 0.2 percent by weight of a divinyl aromatic compound such as divinylbenzene, divinyltoluene or divinylxylene can also be used.

The expandable styrene polymers contain an appropriate amount of a volatile fluid, e.g., pentane or a mixture of pentanes, hexane, petroleum ether, or perchlorofluorocarbons, or mixtures of hydrocarbons and perchlorofluorocarbons, as the ingredient(s) to expand the polymer to a cellular condition. The styrene polymer particles can be of sizes between about 5 and about 120 mesh per inch and are preferably of sizes of from 10 to 80 mesh since such sizes of beads can readily be blended with other ingredients of polyurethane foam formulations or recipes in conventional commercial mixing machines. The compositions of the invention may consist of from about 5 to 60 weight percent of the thermally expandable styrene polymer beads or granules dispersed in correspondingly from 95 to 40 weight percent of a liquid polyether polyol or a mixture of polyether polyols. Among suitable polyether polyols are the adducts of propylene oxide, propylene oxide and up to 20 mole percent of ethylene oxide or butylene oxide, or mixtures of at least 80 mole percent propylene oxide and up to 20 mole percent of ethylene oxide or butylene oxide with aliphatic polyols such as ethylene glycol, propylene glycol, butylene glycol 1,4-butanediol, 1,6-hexanediol, 1,3,6-hexanetriol, glycerol, pentaglycerol, pentaerythritol, and trimethylolpropane, sorbitol or sucrose, or with an aromatic polyhydroxy compound such as 1,2-disydroxybenzene, 1,2,3-trihydroxybenzene, 1,2,3,5-tetrahydroxybenzene, 1,1-bis(-4-hydroxyphenyl) methane, 4,4′-isopropylidenediphenol, which polyether polyol has an OH equivalent weight of at least 150 and up to 2,000. Such polyether polyols are useful in the preparation of rigid, simirigid and flexible polyurethane foams when reacted with organic polyisocyanates in known polyurethane foam forming formulations.

The following examples illustrate ways in which the principle of the invention has been applied but are not to be construed as limiting its scope.

EXAMPLE 1

A charge of 48.7 grams of thermally expandable polystyrene beads of sizes between about 0.4 and 0.7 millimeter diameter and containing 5.3 percent by weight of pentane as blowing agent were mixed with 59.7 grams of a liquid polyether polyol consisting of the adduct of propylene oxide with glycerine to form a polyol having a molecular weight of about 3000 and a viscosity of about 450 centistokes at 77° F. The mixture was maintained in an open beaker at room temperature and atmospheric pressure under a blanket of nitrogen gas, for a period of 234 hours. Thereafter the beads were found to contain 4.93% pentane. The dispersed polystyrene beads retained 93% of the pentane blowing agent.

For purposes of comparison, a charge of the expandable polystyrene beads were maintained in a beaker under similar temperature and pressure conditions for a period of 234 hours. These beads were found to contain only 3.5% pentane. The beads lost 34% of the pentane blowing agent.

EXAMPLE 2

The experiments of Example 1 were repeated employing expandable polystyrene beads containing 5.1% and 4.2% by weight of pentane as blowing agent and of sizes of from 0.7 to 1.2 millimeters and from 0.15 to 0.42 millimeter diameter, respectively. Similar results were obtained.

EXAMPLE 3

A charge of 1200 parts by weight of expandable polystyrene beads of sizes between 0.4 and 0.7 millimeter diameter and containing about 6.5% by weight of pentane as blowing agent was mixed with 2700 parts by weight of a polyether polyol having a molecular weight of 3000 and similar to that employed in Example 1. The mixture was a readily pourable mass. It was sealed in a one gallon tin-coated metal can and stored for a period of two months. Thereafter, the beads were found to be only slightly settled. The polystyrene beads were readily dispersed throughout the liquid by gentle stirring. A composite foam was prepared employing the recipe:

| Ingredient: | Parts |
|---|---|
| Polyether polyol-polystyrene bead mixture gm__ | 1155 |
| Tolylene diisocyanate ml__ | 196.4 |
| Silicone surfactant [2] ml__ | 16 |
| Triethylenediamine [1] ml__ | 16 |
| Stannous octoate ml__ | 2.4 |

[1] An aqueous solution of 6% triethylene diamine and 94% water.
[2] "DC-190" a fluid silicone-alkylene oxide copolymer marketed by Dow Corning Corporation.

The ingredients, except for the tolylene diisocyante were blended together in a high speed mixer. Thereafter, the tolylene diisocyanate was added. The mixture was stirred vigorously for about 5 seconds, then was poured into a 12 x 12 inch square by 6 inches deep box mold and was allowed to foam. As the mass foamed up a cover was locked in place on the top of the mold. After curing for 2 hours the foam bun was removed from the mold. It was a composite of cellular polystyrene bodies dispersed throughout the flexible polyurethane matrix. The composite foam had a density of 4.6 pounds per cubic foot and required a load of 1.89 pounds per square inch to compress a 3 x 3 x 3 inch square test piece of the foam to 60% of its initial thickness. In comparison, pure urethane foam of 4.0 pounds per cubic foot made using a similar recipe required a load of only 0.39 pound per square inch in the same test.

Similar results are obtained when thermally expandable particles of lightly cross-linked styrene polymers such as copolymers of from 99.8 to 99.99 percent by weight of a monovinyl aromatic hydrocarbon, e.g., vinyltoluene, vinylxylene, ethylvinylbenzene or isopropylstyrene, and from 0.20 to 0.01 percent by weight divinylbenzene, divinyltoluene, or divinylxylene, which copolymers contain a volatile fluid foaming agent, and are employed in place of the expandable polystyrene beads used in the foregoing examples.

What is claimed is:

1. A fluid polyol composition suitable for making composite cellular polyurethane foam material which consists essentially of a mixture of from about 5 to 60 percent by weight of a thermally expandable styrene polymer in particles of sizes between about 0.125 and 4 millimeters and correspondingly from 95 to 40 percent by weight of a polyether polyol having a molecular weight of at least 300.

2. A fluid polyol composition as claimed in claim 1 wherein the polyether polyol is an adduct of propylene oxide and glycerine.

3. A fluid polyol composition as claimed in claim 1, wherein the expandable styrene polymer is polystyrene.

4. A fluid polyol composition as claimed in claim 1 wherein the expandable styrene polymer is a copolymer of styrene and from 0.01 to 0.2 percent by weight of divinylbenzene.

References Cited

UNITED STATES PATENTS

| 2,958,905 | 11/1960 | Newberg et al. |
| 3,256,218 | 6/1966 | Knox. |
| 3,051,665 | 8/1962 | Wismer. |
| 3,428,567 | 2/1969 | Newton. |

SAMUEL H. BLECH, Primary Examiner

M. FOELAK, Assistant Examiner

U.S. Cl. X.R.

260—33.2, 859